United States Patent [19]
Carlo et al.

[11] Patent Number: 5,635,899
[45] Date of Patent: Jun. 3, 1997

[54] VEHICLE ANTI-THEFT DEVICE AND SYSTEM

[75] Inventors: L. David Carlo, Litchfield; Danut Voiculescu, No. Olmstead; John Rutkowski, Cuyahoga Falls, all of Ohio

[73] Assignee: Winner International Royalty Corporation, Sharon, Pa.

[21] Appl. No.: 322,478

[22] Filed: Oct. 17, 1994

[51] Int. Cl.$^6$ ............................................... B60R 25/10
[52] U.S. Cl. .............................. 340/426; 70/209; 70/238; 180/287; 307/10.2
[58] Field of Search ........................... 340/426; 70/209, 70/238; 180/287; 307/10.2

[56] References Cited

U.S. PATENT DOCUMENTS

| | | | |
|---|---|---|---|
| 4,738,127 | 4/1988 | Johnson | 70/209 |
| 4,895,009 | 1/1990 | Kleefeldt et al. | 70/238 |
| 4,935,047 | 6/1990 | Wu | 70/209 |
| 4,958,084 | 9/1990 | Carlo et al. | 307/10.2 |
| 4,961,331 | 10/1990 | Winner | 70/209 |
| 5,055,823 | 10/1991 | Fuller | 340/426 |
| 5,128,649 | 7/1992 | Elmer | 340/426 |
| 5,331,307 | 7/1994 | Eizen | 340/426 |
| 5,396,215 | 3/1995 | Hinkle | 340/426 |
| 5,469,135 | 11/1995 | Solow | 307/10.2 |

FOREIGN PATENT DOCUMENTS 2233487   1/1991   United Kingdom ............ 340/426

*Primary Examiner*—Brent A. Swarthout
*Attorney, Agent, or Firm*—Vickers, Daniels & Young

[57] ABSTRACT

A vehicle anti-theft system comprises a mechanical anti-theft device adapted to be attached to a vehicle steering wheel to limit rotation thereof, and an electrical anti-theft device remotely controlled by a transmitter in the mechanical device and operable to inhibit starting of the vehicle engine when the mechanical device is in its mounted position. The mechanical device includes a key operated lock mechanism for locking the device to the steering wheel and a supplemental lock mechanism for maintaining the locked condition of the device in response to tampering with either the key operated or the supplemental lock mechanism.

52 Claims, 9 Drawing Sheets

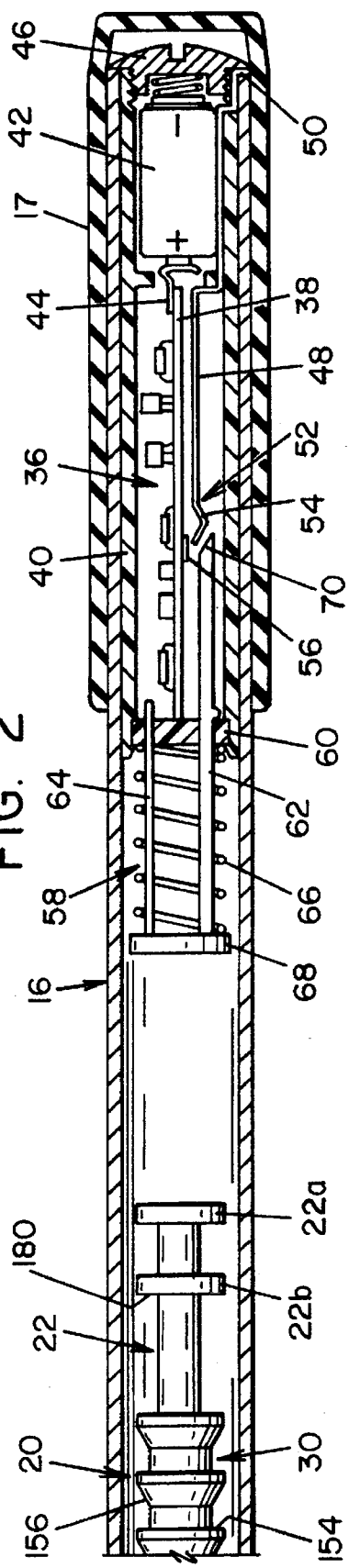
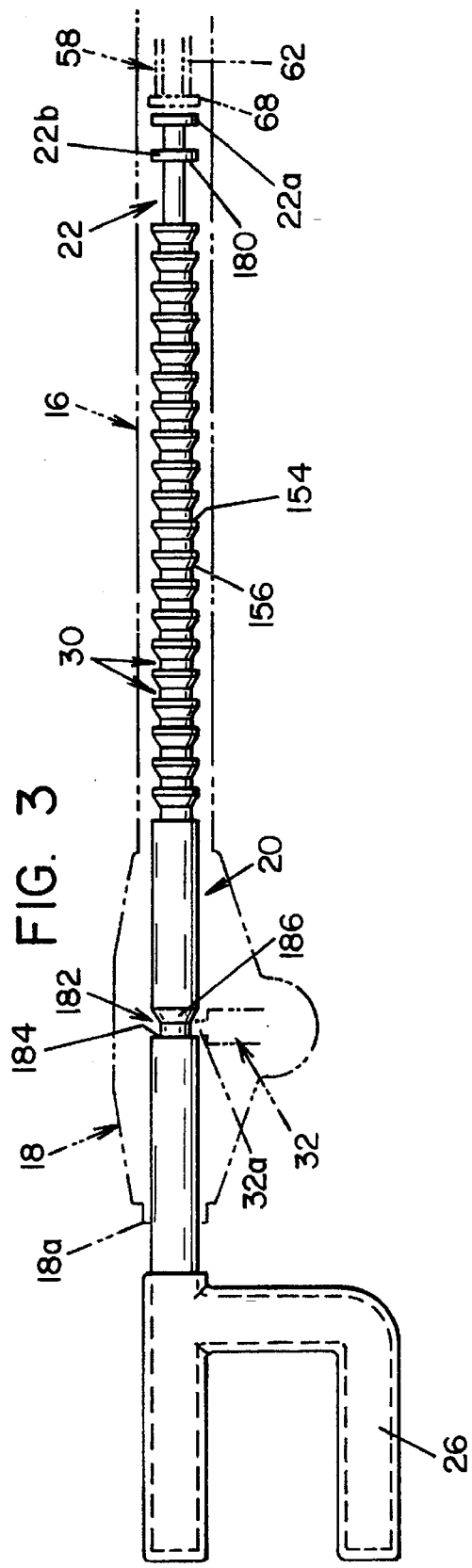
FIG. 2
FIG. 3

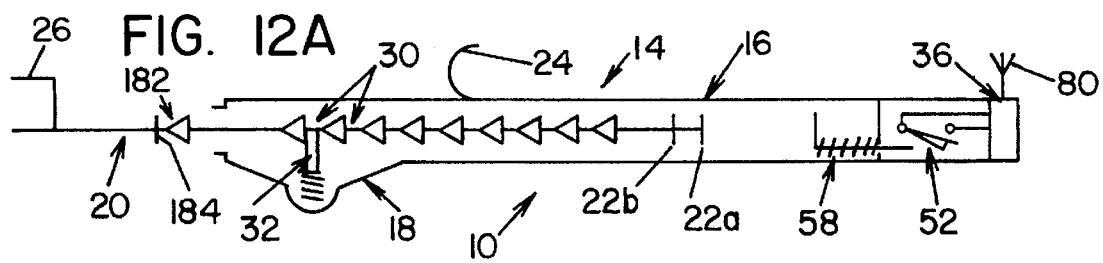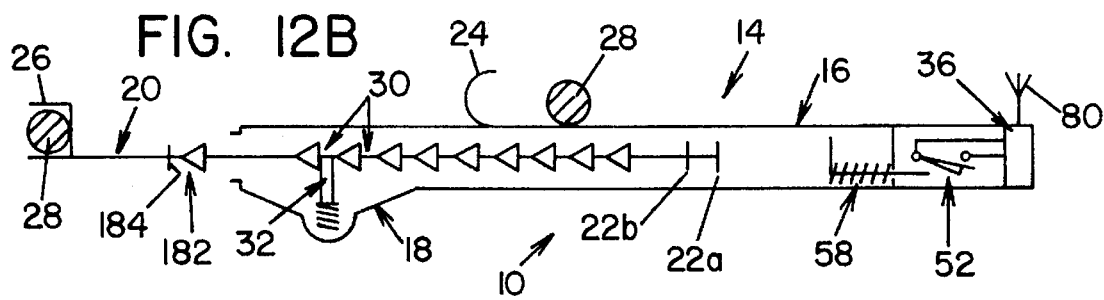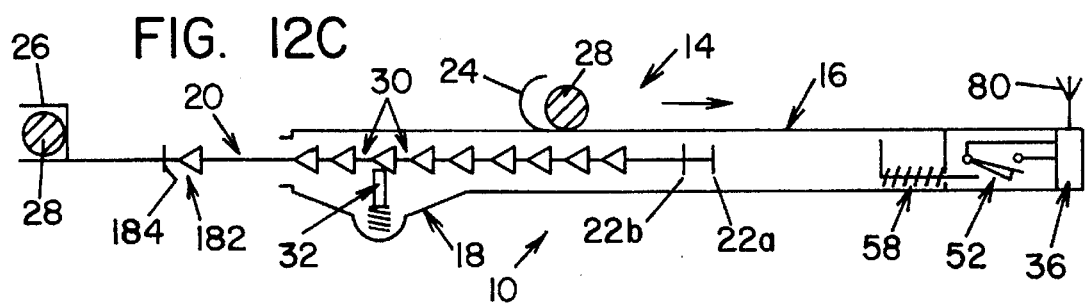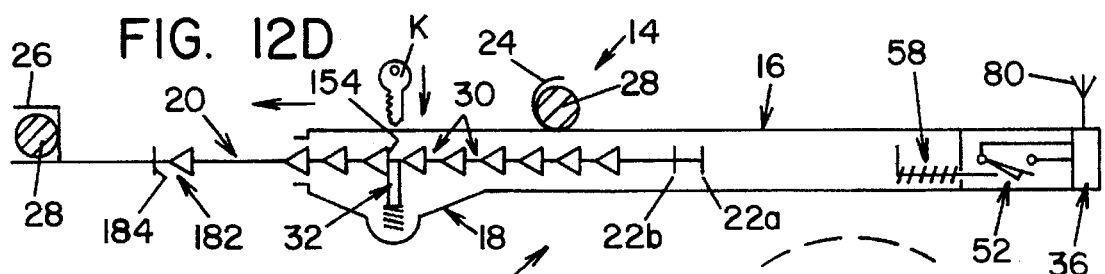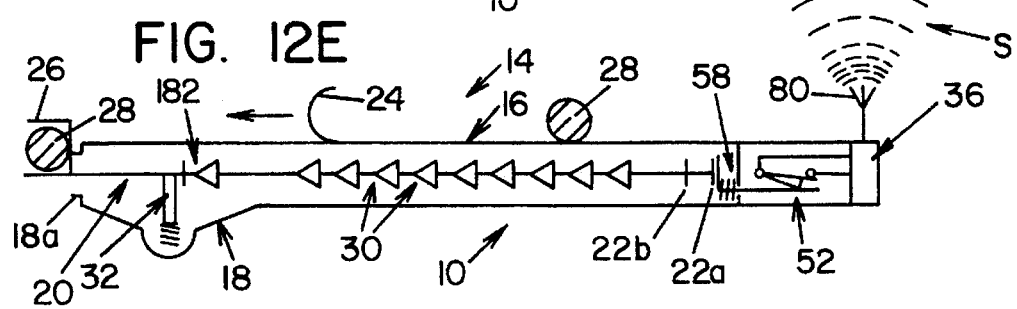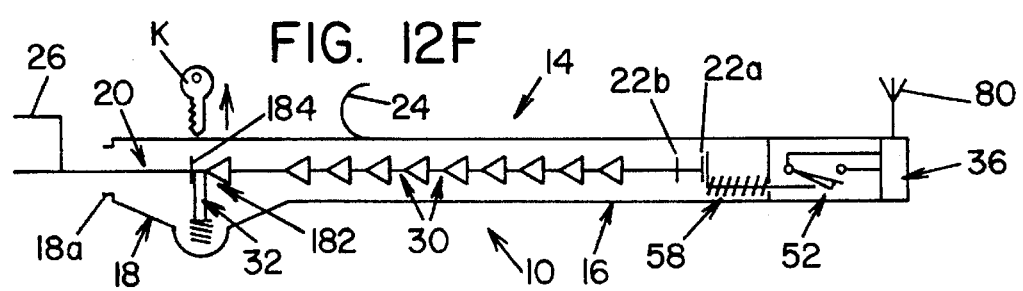

VEHICLE ANTI-THEFT DEVICE AND SYSTEM

BACKGROUND OF THE INVENTION

The present invention relates to the art of vehicle anti-theft systems and devices and, more particularly, to a system comprised of a control device for enabling or inhibiting starting of the vehicle and remotely controlled by an anti-theft device mechanically operable to restrain rotation of the vehicle steering wheel, and an improved device of the latter character.

Vehicle anti-theft devices which are mechanically operable to restrain rotation of a vehicle steering wheel are of course well known and such mechanical devices are shown, for example, in U.S. Pat. No. 4,738,127 to Johnson, U.S. Pat. No. 4,935,047 to Wu and U.S. Pat. No. 4,961,331 to Winner, all of which patents are assigned to the assignee of the present invention and the disclosures of which are incorporated by reference herein for background information. These devices include a pair of attachment components in the form of hooks, each on a different one of a pair of telescopically interengaged members of the device, whereby the hooks are adapted to be relatively displaced between extended and retracted positions relative to one another and which positions correspond, respectively, to mounted and storage positions for the device. In use of the Johnson and Wu devices, the hooks engage diametrically opposed portions of the steering wheel rim of a vehicle and the device includes an arm extending radially outwardly of the rim to preclude rotation of the steering wheel by engagement of the arm with the interior of the vehicle or the operator thereof. In use of the Winner device, one hook engages the steering wheel rim and the other engages a foot pedal lever on the floor of the vehicle, whereby both rotation of the steering wheel and depression of the foot pedal are restrained so as to preclude unauthorized operation of the vehicle. In each device, a key operated lock mechanism is provided for locking the attachment components against relative displacement when in the mounted position of the device and for unlocking the attachment components to enable dismounting of the device from its use position and displacement of the attachment components to the storage position.

It is likewise known to provide a motor vehicle with an electrical anti-theft device which includes a vehicle control unit shiftable between a first condition allowing operation of the motor vehicle and a second condition inhibiting operation of the vehicle. The control unit may, for example, be operable to close and open the vehicle ignition circuit to respectively allow and inhibit operation of the vehicle, and shifting of the control unit between the two conditions can be remotely controlled through a transmitter carried by an authorized operator of the vehicle and a receiver associated with the control unit. The control signal may, for example, be a series of coded pulses unique to the transmitter, in which case the receiver has a decoding network for recognizing the unique coded pattern and shifting the control unit when a verified coded signal is received. A system of this character is shown in U.S. Pat. No. 4,958,084 to Carlo et al, which is assigned to the assignee of the present invention and the disclosure of which is also incorporated herein by reference. Such devices may, for example, provide the desired anti-theft deterrent when armed by issuing a visible or audible alarm in response to an attempt to enter the vehicle or, as disclosed in Carlo et al, by inhibiting operation of a portion or portions of the electrical system in the vehicle such as the ignition system so as to preclude starting of the vehicle other than by an authorized user.

While mechanically operable vehicle anti-theft devices and electrical anti-theft devices of the foregoing character are each extremely effective in providing the desired anti-theft deterrent, vehicle operators often desire to optimize protection of their vehicles against theft by using such a mechanical device in conjunction with an electrically operated security device. Since the arming and disarming of the electrical anti-theft device is sometimes achieved through the use of a key operated switch arrangement located outside or inside the vehicle, the use of both mechanical and electrical anti-theft devices can require two keys or a key and a transmitter, one unique to each device. Thus, one or the other of the devices may not be used by a vehicle owner because of the inconvenience of having to carry extra keys or an extra key and a transmitter in conjunction with use of the vehicle, and the added inconvenience of having to locate a particular one of the keys or the transmitter to arm and disarm the electrical security device and having to locate the particular key for mounting or dismounting the mechanical device. It is obvious of course that if both devices are not used simultaneously, the advantage of an added deterrent against theft of the vehicle cannot be obtained.

Further, in connection with mechanical anti-theft devices of the foregoing character, thieves often attempt to detach the device from the vehicle steering wheel by removing the key lock cylinder from the housing of the device so as to access and enable displacement of the bolt or keeper component to an unlatched condition which enables relative displacement of the attachment components in the direction to achieve removal of the device from attachment with steering the wheel. Thieves will also cut through the steering wheel rim to achieve detachment of the mechanical anti-theft device therefrom. In either event, such detachment enables steering of the vehicle whereby, if the mechanical device is used alone, the anti-theft deterrent thereof is totally lost. Even if the mechanical device is used in conjunction with an electrical anti-theft device, half of the anti-theft deterrent is lost, and thieves are quite adept at cutting wires or otherwise disabling electrical systems, whereby the deterrent effect thereof is also substantially reduced or totally lost. Accordingly, it becomes desirable not only to encourage a vehicle owner to use both a mechanical and electrical device by making such use convenient, but also to optimize the protection afforded by the two devices by optimizing the protection against disabling or defeating the anti-theft deterrent effect thereof.

SUMMARY OF THE INVENTION

In accordance with one aspect of the present invention, a vehicle anti-theft security system is provided comprising mechanical and electrical security devices having a feature of interdependency which provides for the system to be practical in use with respect to both devices and more convenient to the vehicle owner in conjunction with such use relative to the combined use heretofore of mechanical and electrical security devices. More particularly in this respect, an anti-theft system in accordance with this aspect of the invention comprises a mechanical device for limiting rotation of a vehicle steering wheel and which includes a pair of attachment components relatively displacable between mounted and stored positions, and an electrically operated security device which is operable when armed to inhibit operation of the motor vehicle such as by opening the ignition circuit thereof. Enabling and inhibiting of the operation of the motor vehicle in the latter respect is controlled by the relative positions of the attachment components of the mechanical device with respect to their mounted and stored positions. More particularly, when the mechanical device is mounted with respect to a vehicle steering wheel the electrical device is operable to inhibit operation of the motor vehicle, and when the attachment components are in the stored position thereof the electrical device is operable to enable operation of the vehicle. Preferably in this respect, the mechanical anti-theft device includes a transmitter for transmitting a coded electromagnetic or other signal when the attachment components are in the stored position, and the electrical anti-theft device comprises a vehicle control unit including a receiver for receiving the remotely transmitted signal and, in response thereto, functioning to enable operation of the vehicle such as by closing the ignition circuit thereof. When the attachment components of the mechanical device are displaced to the mounted position thereof, transmission of the signal is interrupted and the vehicle control unit responds by inhibiting operation of the vehicle such as by opening the ignition circuit. Accordingly, both the mechanical and the electrical anti-theft devices are rendered operable for their intended anti-theft functions simply by mounting the mechanical device relative to the vehicle steering wheel, and enabling of the operation of the vehicle by the owner is likewise achieved simply by removing the mechanical device from its mounted position and displacing the attachment components to the stored position thereof.

In accordance with another aspect of the invention, access to the transmitter in the mechanical anti-theft device by an unauthorized person for the purpose of disarming the vehicle control device and enabling operation of the vehicle is precluded. Thus, even if a thief disconnects the mechanical device from the vehicle steering wheel, such as by cutting through the steering wheel rim, the transmitter cannot be accessed by the thief either by displacing the attachment components toward the storage position thereof or by completely separating the attachment components to access the transmitter which is associated with one of the components. Preferably, this is achieved through a key operated lock mechanism by which the attachment components are locked against relative displacement toward the storage position thereof and interengage against complete separation. Further in connection with this aspect of the invention, the key operated lock arrangement is operable to provide a holding position near the storage position for the relatively displacable attachment components which precludes displacement of the components to the storage position and thus precludes actuation of the transmitter. These features advantageously optimize protection against defeating the security system in the armed mode thereof, and the latter feature advantageously enables the vehicle owner in certain situations to leave the mechanical device in the vehicle unattached with respect to the steering wheel thereof while still precluding actuation of the transmitter by the would be thief to enable operation of the vehicle.

In accordance with a further aspect of the invention, the mechanical anti-theft device includes a key operated lock mechanism for locking the attachment components in the mounted position thereof against relative displacement toward the storage position, and a supplemental lock arrangement which is operable to lock the attachment components against relative displacement toward the storage position thereof in response to tampering with either the key operated or the supplemental locking mechanism. Thieves often attempt to remove a mechanical anti-theft device from attachment with a vehicle steering wheel by removing the lock cylinder from its support so as to gain access to and enable manual displacement of the keeper or lock bolt to its unlocked position enabling relative displacement between the attachment components. Such removal of the lock cylinder can be achieved, for example, by drilling out a lock pin by which the cylinder is held in place in the device. In accordance with this aspect of the present invention, such removal of the key lock cylinder actuates the supplemental lock mechanism whereby a supplemental keeper or lock bolt is displaced to a locked position by which the attachment components are locked against relative displacement in the direction toward the storage position thereof. Should the thief attempt to disable the supplemental locking mechanism prior to attempting to remove the key lock cylinder, the supplemental latch or bolt is actuated to its locked position in response to such tampering, whereby the latches of both the key operated lock mechanism and the supplemental lock mechanism are operable to lock the attachment components against relative displacement in the direction toward the storage position thereof. The supplemental lock arrangement provided in accordance with this aspect of the invention optimizes protection against detachment of the mechanical device from the vehicle steering wheel and thus optimizes the anti-theft protection provided by the mechanical device either alone or in conjunction with an electrical anti-theft device including a transmitter associated with the mechanical device as discussed hereinabove. Particularly in this respect, the supplemental lock keeper functions in the same manner as the keeper of the key operated lock mechanism to preclude a thief from gaining access to and activating the transmitter associated with the mechanical device and thus enabling operation of the motor vehicle.

It will be appreciated that an anti-theft system according to the present invention not only provides the individual advantages of two different security systems, including the diversity therebetween by one being mechanical and the other electrical, but also eliminates the inconvenience heretofore encountered in connection with having to provide independent arrangements for operating each device between its use and non-use modes. Further, while accommodating the vehicle owner by optimizing the convenience of using the two different security devices, and in particular by having the electrical device controlled by the disposition of the attachment components of the mechanical device, security is further promoted by increasing the difficulty and time required on the part of a thief in an effort to eliminate the security devices and thus steal the vehicle. Such difficulty and time is significantly increased with respect to the effort of a thief to remove a mechanical ant-theft device having a supplemental locking arrangement in accordance with the present invention. In any event, such difficulty and time requirement in connection with eliminating security devices in accordance with the present invention are more than likely sufficient to cause a would-be thief to abandon the theft effort.

It is accordingly an outstanding object of the present invention to provide an improved vehicle anti-theft system comprising mechanical and electrical security devices having a feature of interdependency providing for the system to be more convenient with respect to use thereof while optimizing protection against theft of a vehicle.

Another object is the provision of an anti-theft system of the foregoing character wherein the mechanical anti-theft device is mountable in a vehicle to limit rotation of the vehicle steering wheel and includes relatively displacable attachment components for mounting the device, wherein the electrical anti-theft device is shiftable between armed and disarmed modes respectively inhibiting and enabling operation of the motor vehicle, and wherein such shifting is responsive to the positions of the attachment components of the mechanical device relative to one another.

Yet another object is the provision of an anti-theft system of the foregoing character wherein the electrical anti-theft device is remotely controlled by a signal transmitter incorporated in the mechanical anti-theft device and actuated between transmitting and non-transmitting modes in response to the displacement of the attachment components thereof relative to one another.

Yet a further object is a provision of an anti-theft security system of the foregoing character wherein the mechanical anti-theft device includes a key operated lock mechanism for locking the attachment components against relative displacement in the direction to actuate the transmitter and against separation of the attachment components to provide access to the transmitter.

Still a further object is the provision of an anti-theft system of the foregoing character wherein the mechanical anti-theft device includes a supplemental lock mechanism operable in response to tampering with either the key operated lock mechanism or the supplemental lock mechanism to lock the attachment components against relative displacement to achieve actuation of the transmitter or to obtain access thereto.

Another object is the provision of an anti-theft system of the foregoing character wherein the electrical anti-theft device includes a control unit associated with an electrical circuit in the vehicle so as to close and open the latter to enable or inhibit operation of the vehicle in response to actuation of the signal transmitter incorporated in the mechanical anti-theft device between modes corresponding to disarmed and armed conditions of the anti-theft system.

Still a further object is the provision of a mechanical anti-theft device having a key operated lock mechanism for locking attachment components of the device against relative displacement in a given direction with a supplemental lock mechanism for locking the attachment components against such relative displacement in response to tampering with either one of the key operated lock mechanism and the supplemental lock mechanism.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawing in which:

FIG. 2 is a sectional elevation view of a portion of the mechanical anti-theft device showing the control signal transmitter mounted therein;

FIG. 3 is an elevation view of the rod component of the mechanical anti-theft device in accordance with the invention;

FIGS. 12A-F schematically illustrate relative positions between the component parts of the mechanical anti-theft device in connection with the mounting and dismounting thereof from a vehicle steering wheel and activation of the transmitter upon dismounting to enable operation of the vehicle.

DESCRIPTION OF PREFERRED EMBODIMENTS

Figure 1:
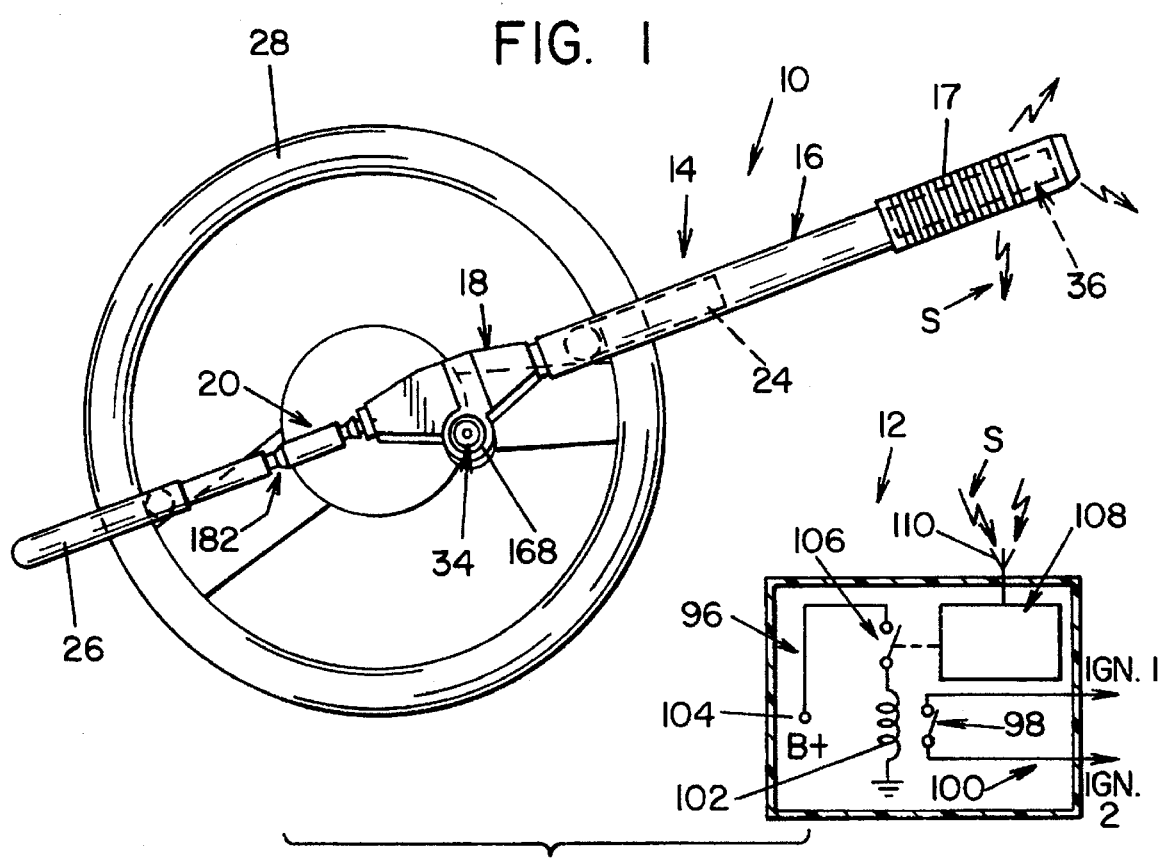
FIG. 1 is a somewhat schematic illustration of a vehicle anti-theft system in accordance with the present invention and illustrating a mechanical device attached to a vehicle steering wheel and an electrical device remotely controlled thereby.
Figure 4:
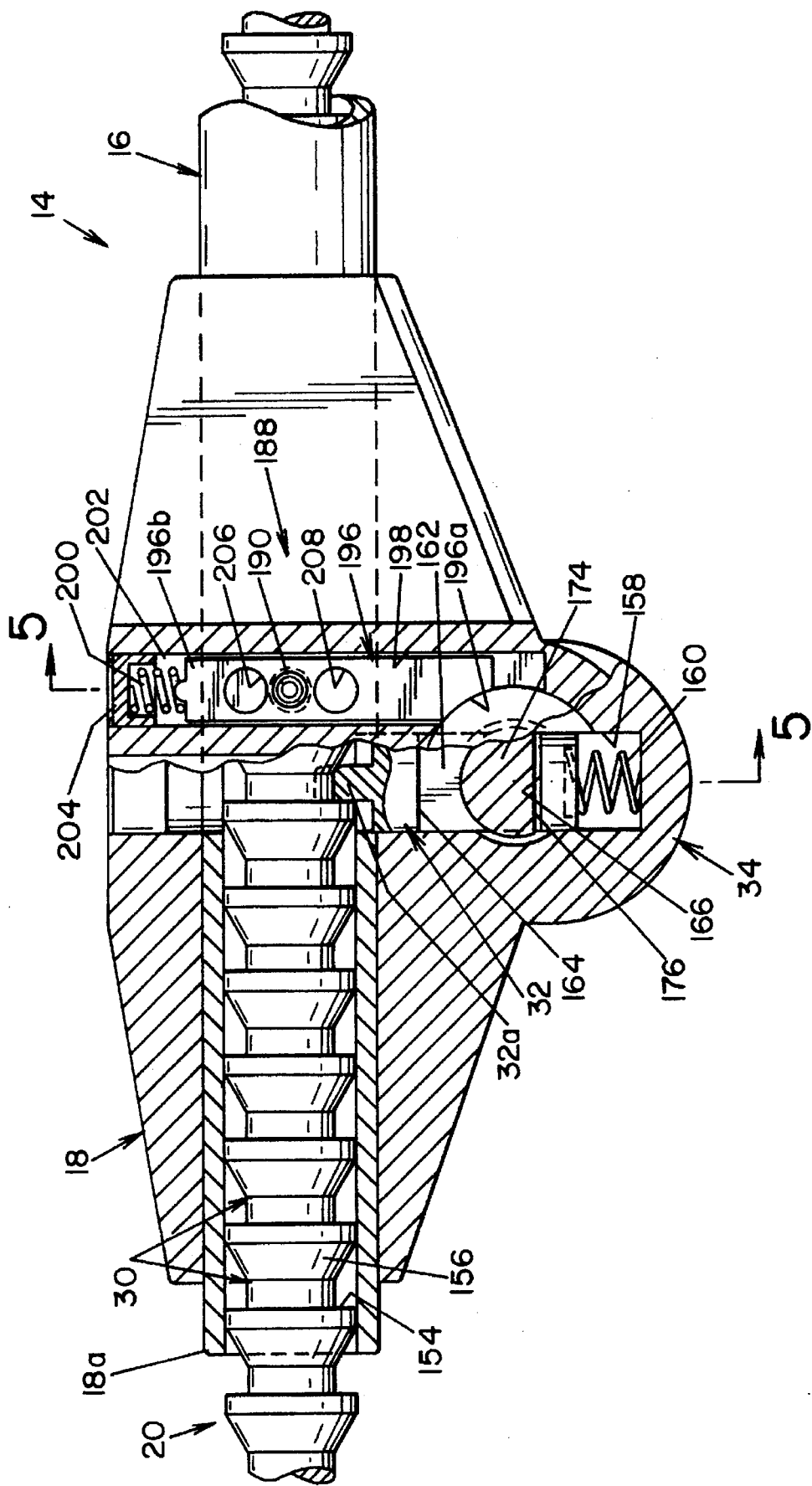
FIG. 4 is an enlarged planned view, partially in section, showing the key operated and supplemental lock mechanisms for the mechanical device in accordance with the present invention.

Referring now in greater detail to the drawing wherein the showings are for the purpose of illustrating preferred embodiments of the invention only, and not for the purpose of limiting the invention, FIG. 1 illustrates a vehicle anti-theft system comprising a mechanical anti-theft device 10 and an electrical anti-theft device 12 remotely controlled by the mechanical device as described in greater detail hereinafter. Mechanical device 10, in the preferred embodiment, is a vehicle anti-theft steering wheel lock of the type illustrated in the aforementioned patents to Wu and Johnson incorporated herein by reference, whereby a detailed description of the structure and operation thereof will not be necessary. Briefly, anti-theft device 10 includes a housing 14 comprising an elongated tubular body portion 16 of steel and a lock housing portion 18. Body portion 16 has an outer end provided with a hand grip 17 and an inner end extending through and attached to lock housing portion 18. An elongated steel rod 20 is axially slidably received in housing 14 and, as shown in FIGS. 2 and 3, has an inner end 22 in body portion 16. Attachment components in the form of hooks 24 and 26 are provided respectively on housing 14 and rod 20 and are adapted to engage diametrically opposed portions of a vehicle steering wheel rim 28 from the inside thereof when the device is installed on the steering wheel as shown in FIG. 1. As best seen in FIGS. 3 and 4, rod 20 is provided with annular grooves 30 along the length thereof and, as will be described in greater detail hereinafter, notches 30 cooperate with keeper member 32 of a key operated lock mechanism 34 mounted in lock housing portion 18 of housing 14 to axially hold rod 20 and thus attachment components 24 and 26 in the mounted position thereof when the anti-theft device is mounted on steering wheel rim 28 as shown in FIG. 1. When anti-theft device 10 is removed from the steering wheel, rod 20 is retracted into housing 14 whereby hook 26 moves toward hook 24 and into engagement with lock housing portion 18 to position the hooks in a storage position. When the anti-theft device is installed, rod 20 is extended relative to housing 14 for hook 26 to move away from hook 24 for the two hooks to engage against diametrically opposed inner sides of the steering wheel rim. It will be appreciated, therefore, that the attachment components 24 and 26 of the anti-theft device are displacable between retracted and extended positions relative to one another and which positions respectively correspond to storage and mounting positions for the attachment components and thus the anti-theft device.

In accordance with one aspect of the invention, mechanical anti-theft device 10 is provided with a control signal transmitter 36 in housing 14 at the outer end of body portion 16 thereof. Transmitter 36 is operable to control the actuation of electric anti-theft device 12 so as to inhibit and enable operation of the motor vehicle in the manner described more fully hereinafter. In the embodiment illustrated, transmitter 36 includes a transmitter circuit board 38 supported in a transmitter housing including a tubular sleeve 40 of suitable plastic material received in the outer end of housing portion 16 and suitably secured therein against displacement relative thereto. The transmitter circuit is powered by a six volt battery 42 supported in the outer end of sleeve 40 and having its B+ terminal engaging contact 44 on circuit board 38. A battery access cap 46 closes the outer end of sleeve 40, and battery 42 has a B– contact connected to circuit board 38 through access cap 46 and a transmitter switch spring finger 48 having an outer end 50 captured between cap 46 and the outer most end of body portion 16. The transmitter includes a control switch 52 defined by contact end 54 of spring finger 48 and contact 56 on circuit board 38. Switch 52 is normally open and is adapted to be closed as described more fully hereinafter by a switch actuator assembly 58 extending axially inwardly of housing portion 16 from inner end wall component 60 of the transmitter housing. Switch actuator assembly 58 includes a switch actuating finger 62 and a guide finger 64 axially slidably supported by corresponding openings therefor in end wall 60 and biased outwardly of end wall 60 by a coil spring 66 interposed between end wall 60 and an actuating head 68 to which the outer ends of fingers 62 and 64 are secured. Spring 66 biases switch actuator 58 to the position shown in FIG. 2 wherein the tapered inner end 70 of actuating finger 62 disengages switch contact 54 to provide the normally open condition of switch 52. As will be appreciated from FIG. 2, displacement of switch actuator 58 to the right displaces actuator finger 62 to the right and thus inwardly of transmitter housing sleeve 40, whereby tapered end 70 of the finger engages contact end 54 to displace the latter into engagement with contact 56 on circuit board 38. In the embodiment illustrated, closure of switch 52 shifts transmitter 36 to a signal transmitting mode, and the manner and conditions under which such shifting takes place, as well as the operations of the electrical anti-theft device which take place as a result thereof, will be described in greater detail hereinafter.

Figure 9:
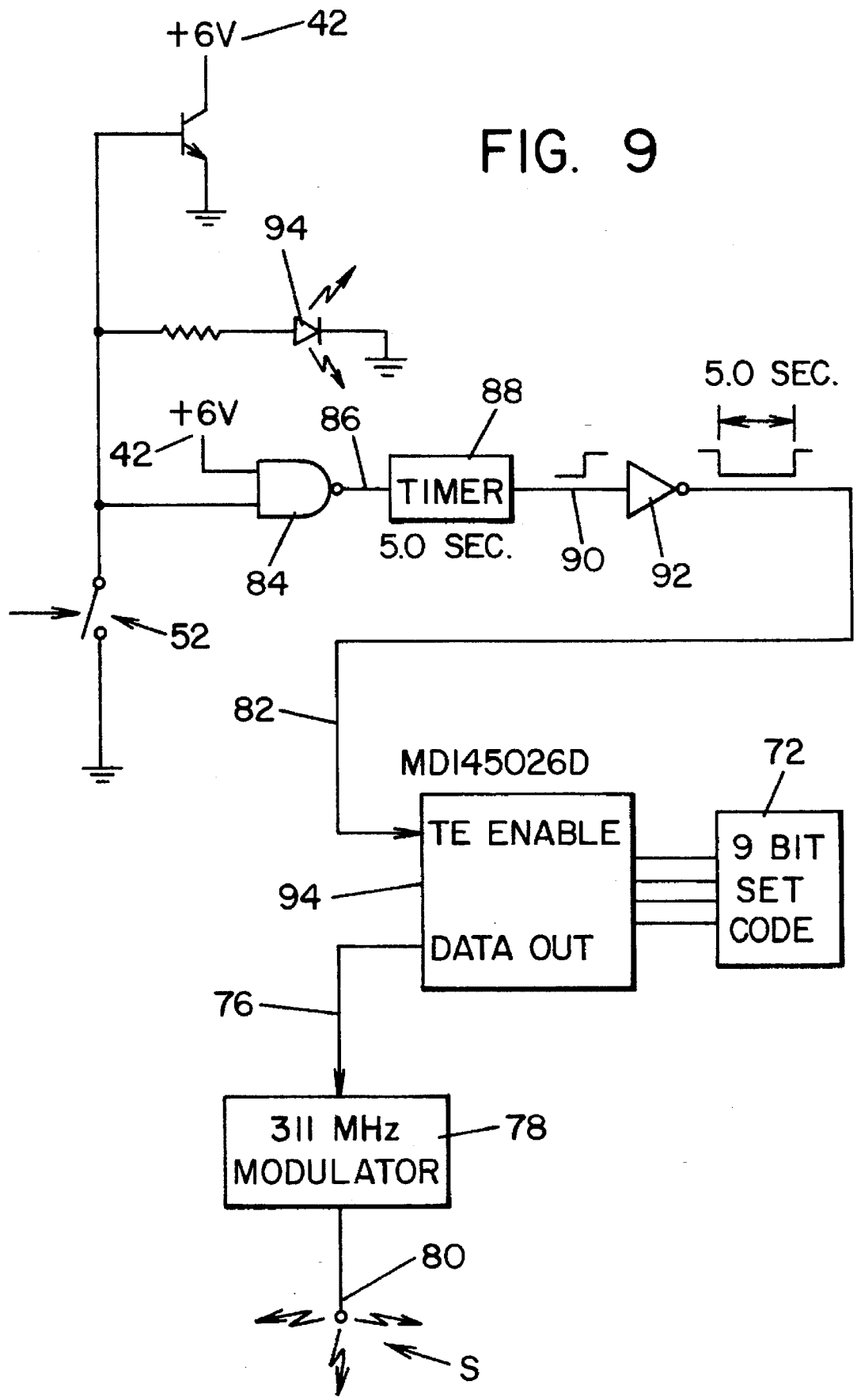
FIG. 9 is block diagram of the circuitry for the signal transmitter housed in the mechanical device.

Referring first to FIG. 9 of the drawing, transmitter 36 comprises a microprocessor or micro chip and circuitry which, when activated, transmits a series of electromagnetic coded signals S of about five seconds duration, and for a predetermined total period of time, such as about two minutes. The coded signals are an arrangement of pulses unique to the transmitter, whereby the latter identifies an authorized transmitter with respect to controlling the electrical anti-theft device as described hereinafter. More particularly in this respect, transmitter 36 includes a code setter 72 for providing a preselected unique coded signal to encoder 74 which, when enabled, outputs the coded signal through line 76 to modulator 78 from which the coded signal S is outputted through antenna 80. Encoder 74 is enabled by an input signal through line 82 which is generated in response to closing normally open transmitter control switch 52. More particularly in this respect, closure of switch 52 provides a second input to NAND gate 84 which, in response to the input, outputs a signal through line 86 to pulse timer 88 which in turn outputs a pulse signal through line 90 to invertor 92 and which pulse signal has a predetermined duration of, for example, five seconds. Invertor 92 outputs a corresponding five second pulse signal through line 82 to encoder 74 which enables the latter for the output of the predetermined coded signal through line 76. Preferably, timer 88 is operable to intermittently output the five second signals through line 90 for a predetermined period of time such as, for example, two minutes after which the timer is deactivated until such time as it is reset by opening and reclosing transmitter control switch 52. Preferably, an LED 94 is provided in the transmitter circuit and is made visible exteriorly of the mechanical anti-theft device. Upon closure of transmitter control switch 52, LED 94 flashes for the two minute time period during which timer 88 intermittently transmits the five second signals for enabling encoder 74, whereby the vehicle operator is visually aware that the transmitter is transmitting and when such transmission ceases.

As mentioned hereinabove, transmitter 36 is operable to control electrical anti-theft device 12 in a manner which inhibits or enables operation of the motor vehicle. Generally in this respect, as will be appreciated from FIGS. 1 and 1A of the drawing, electrical anti-theft device 12 includes a vehicle control unit 96 which, in the embodiment illustrated, includes a relay switch 98 for opening and closing the vehicle ignition circuit 100, thus to respectively inhibit and enable starting of the vehicle and thus operation thereof. The vehicle control unit further includes a relay coil 102 adapted to be energized across a 12 volt power supply 104, such as the vehicle battery, in response to closure of switch 106 of the control unit and the mode of switch 106 is controlled by a receiver and vehicle control unit shifter 108 of the electrical anti-theft device. Receiver and vehicle control unit shifter 108 includes a microprocessor or micro chip and circuitry operable to shift vehicle control unit 96 between the inhibiting and enabling conditions thereof with respect to vehicle operation in response to receiving a valid coded signal from transmitter 36 in the mechanical anti-theft device. The electrical anti-theft device 12 can, for example, be mounted behind the dash board or in the engine compartment of the vehicle, whereby it will be appreciated that the electrical anti-theft device is remotely controlled by the mechanical anti-theft device. Moreover, while the vehicle control unit is illustrated and described herein in conjunction with the ignition circuit of a vehicle, it will be appreciated that the unit can be devised to control other circuitry in the vehicle by which operation of the vehicle is inhibited such as, for example, the starting motor solenoid circuit.

Figure 10:
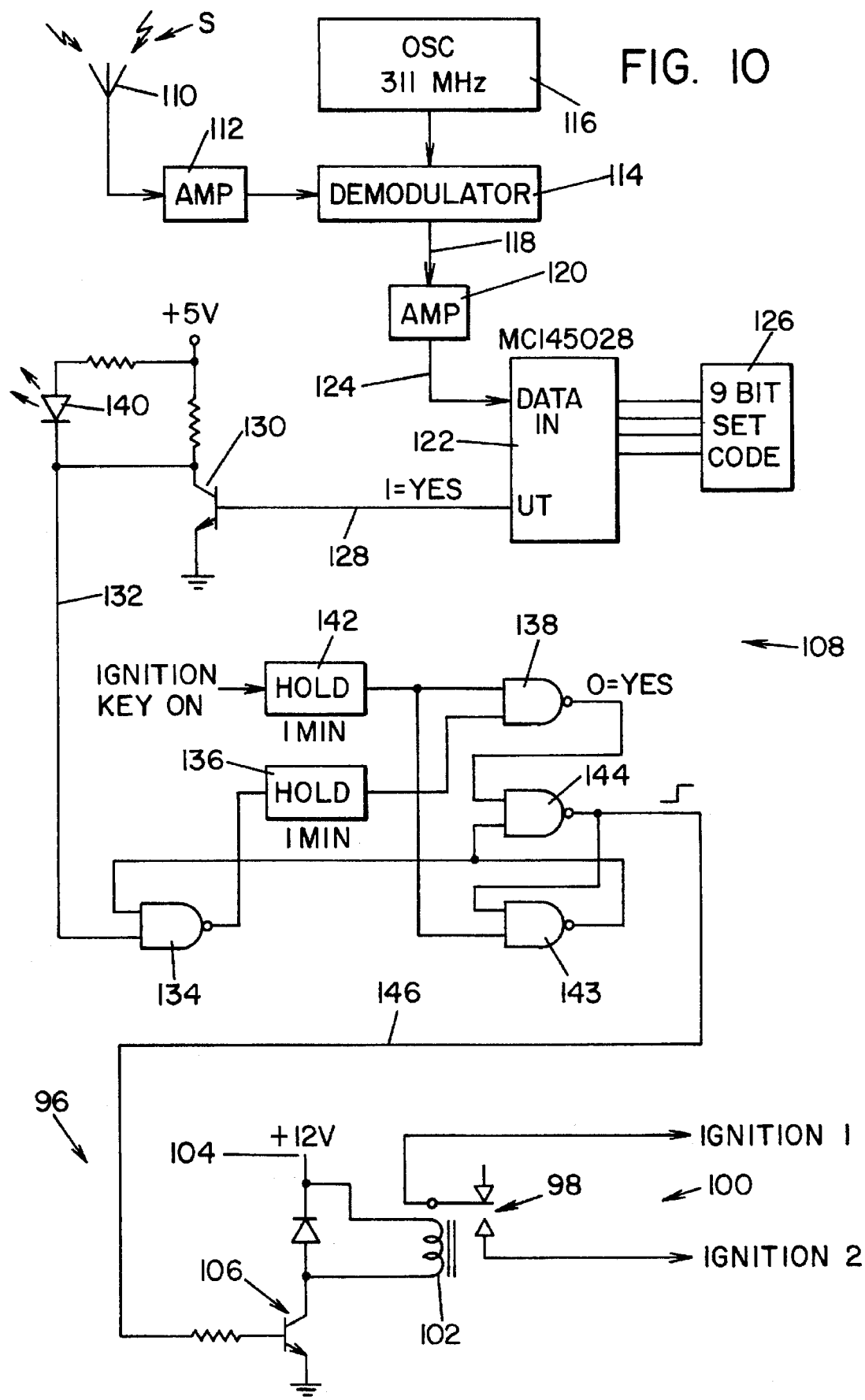
FIG. 10 is a block diagram of the circuitry for the electrical anti-theft device.
Figure 11:
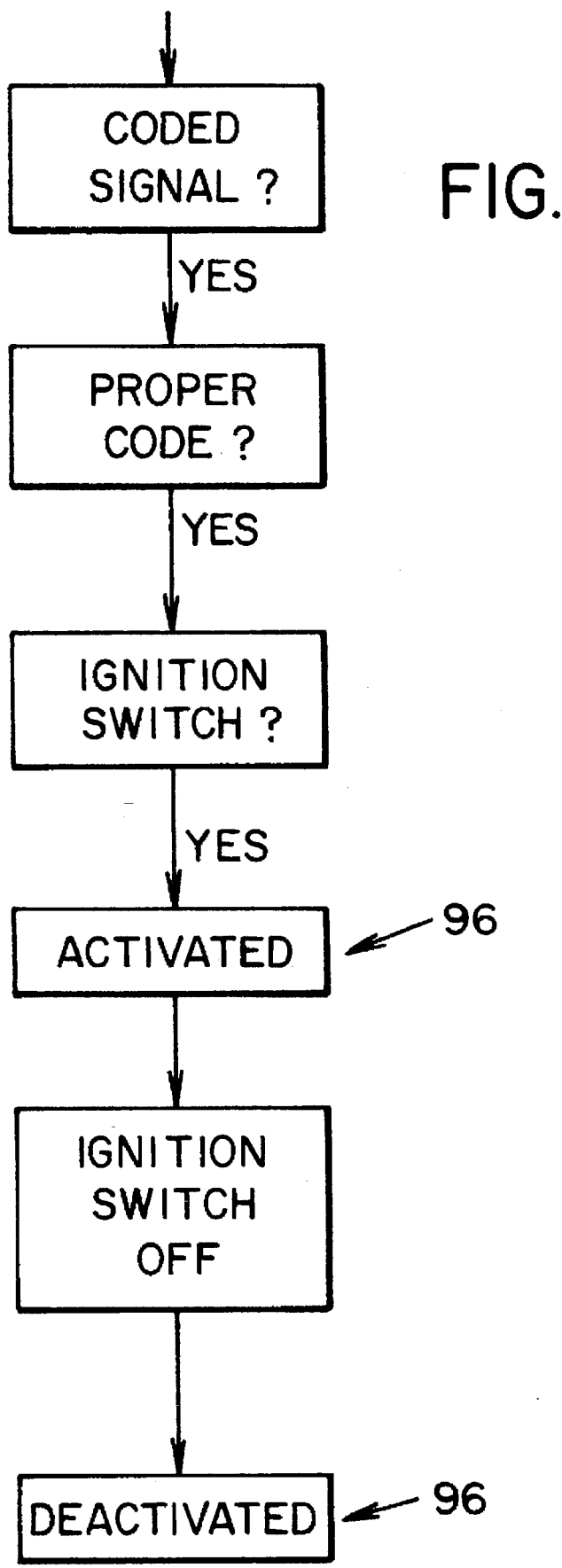
FIG. 11 is a flow diagram for the electrical anti-theft device.

More particularly with regard to the shifting function of receiver and vehicle control unit shifter 108, and as will be appreciated from FIGS. 10 and 11 of the drawing, the receiver and control unit shifter receives coded signals S from transmitter 36 at receiver antenna 110, which signal is amplified by amplifier 112 and transmitted to demodulator 114 which is operable in conjunction with the input from oscillator 116 to output a coded pulse signal through line 118 to amplifier 120 and thence to the input of decoder 122 through line 124. A code setter 126 inputs the same predetermined code information to decoder 122 as is provided in the transmitter by code setter 72 thereof, and if the coded signal inputted to decoder 122 through line 124 is recognized by the decoder as the proper code, the decoder outputs a signal through line 128 which is indicative that a proper code has been received from the transmitter. The signal in line 128 turns transistor 130 on, whereby a signal is transmitted through line 132 to NAND gate 134 which in turn outputs a signal through timer 136 as an input to NAND gate 138 indicating that a proper code signal has been received from the transmitter. This signal is transmitted to gate 134 for a predetermined time such as one minute. Preferably, the receiver and shifter 108 includes an LED 140 which flashes when a proper code signal is received as indicated by the output through line 128, and LED 140 can, for example, be on the dashboard of the vehicle so that the vehicle owner or other authorized operator of the vehicle can visually determine that the receiver and shifter has received a proper code from the transmitter. At this point, the owner or authorized operator has from one to two minutes to start the vehicle. In this respect, when the ignition key is inserted and turned to the on position, a signal indicative of this is delivered through timer 142 for a predetermined period of time such as one minute as a second input to NAND gate 138. This signal is also inputted to NAND gate 143.

In response to receiving signals indicative of a valid code signal and the fact that the ignition switch is in the on position, NAND gate 138 goes low and outputs a signal to NAND gate 144 which outputs a control signal through line 146 which closed switch 106 in the vehicle control unit circuit and which switch in the embodiment disclosed is a transistor which is biased to conduct in response to the signal in line 146. When the transistor conducts, relay coil 102 is energized to shift relay switch 98 from the normally open position thereof shown in FIG. 10 to a closed position connecting lines 1 and 2 of ignition circuit 100 enabling starting and thus operation of the motor vehicle. Once the vehicle is started, current in the ignition circuit maintains relay switch 98 closed for so long as the vehicle is operated. When the vehicle engine is turned off, relay switch 98 returns to its normally open position, whereby restarting of the vehicle requires resetting and reactivating the transmitter as explained more fully hereinafter. In the event that the holding period of either of the timers 136 and 142 expires before the vehicle is started in the foregoing manner, or when the holding periods expire subsequent to starting the vehicle, NAND gate 138 goes high, NAND gate 144 goes low whereupon switch 106 opens, and NAND gate 143 goes high whereby NAND gate 134 goes low to shut down the control signal circuit. The control signal circuit remains shutdown until such time as the ignition key switch is turned to the off position and then back to the on position to reset timer 142. Thus, if transmitter 36 transmits a valid coded signal to the receiver for a period of time after such shutdown, and the vehicle has not been started, the operator can reset the key switch and have one more minute to start the vehicle. However, if the transmitter continued to transmit signal S after the vehicle is started, the output of NAND gate 138 remains high to preclude the output of a control signal through line 146.

Figure 1A:
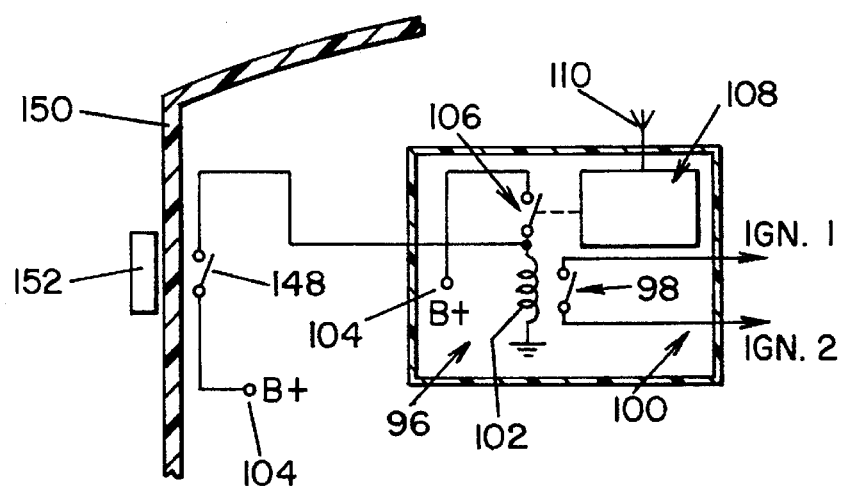
FIG. 1A schematically illustrates a modification of the anti-theft system for overriding the remote control of the electrical device.

As mentioned hereinabove, the transmission of a coded signal by transmitter 36 is controlled by the relative positions of the housing 14 and rod 20 and thus attachment components 24 and 26 of mechanical anti-theft device 10. When the latter device is mounted on a steering wheel rim 28 as shown in FIG. 1, transmitter 36 is deactivated, whereby relay switch 98 in the electrical anti-theft device 12 is open, thus inhibiting operation of the motor vehicle. FIG. 1A schematically illustrates a modification of the electrical anti-theft device which advantageously enables operation of the motor vehicle under certain conditions, such as valet parking, where it is desired not to mount the mechanical anti-theft device and, at the same time, to enable operation of the motor vehicle independent thereof. More particularly in this respect, the electrical anti-theft device is provided with a normally open bypass switch 148 which is adapted to connect relay coil 102 across battery 104 when closed so as to close relay switch 98 and enable operation of the vehicle. Switch 148 can, for example, be a magnetically actuated switch located behind an interior or exterior panel 150 of the vehicle so as to be closed by positioning a magnetic actuator 152 against the panel. Obviously, the bypass switch can be other than magnetically actuated and, in this respect, could for example be a key operated switch.

Referring again to FIGS. 1-3 of the drawing, when mechanical anti-theft device 10 is mounted on steering wheel rim 28 as shown in FIG. 1, inner end 22 of rod 20 is positioned out of engagement with head 68 of transmitter switch actuator 58, whereby the transmitter is deactivated and does not transmit a coded signal. Thus, as will be appreciated from the foregoing description of the electrical anti-theft device, relay switch 96 in the vehicle control unit circuit is in its normally open position and operation of the vehicle is inhibited by opening ignition circuit 100. When the mechanical device is unlocked and attachment component 26 is displaced toward attachment component 24 to achieve removal of the device from the steering wheel rim, attachment component 26 is adapted to be moved into abutting engagement with shoulder 18a of lock housing 18. In this position of attachment component 26, which would be to the right of the position shown in FIG. 3, rod 20 is fully retracted into housing 14 and head 22a on the innermost end of the rod engages head 68 of actuator 58 and displaces the latter to the right in FIG. 2 such that actuator finger 62 closes transmitter switch 52 by displacing contact 54 into engagement with contact 56. Upon closing switch 52, transmitter 36 transmits a coded signal as described hereinabove, and receiver and vehicle control unit shifter 108 receives the coded signal as described hereinabove and enables operation of the motor vehicle.

When the transmitter has transmitted the coded signal intermittently for a predetermined period of time as described above, transmission of the coded signal ceases. If the vehicle owner or other authorized operator has not started the vehicle as described above within the time allotted by timer 88 in transmitter 36 and timers 136 and 142 in receiver and vehicle control unit shifter 108, the transmitter must be reactivated by opening and reclosing switch 52. This is achieved by withdrawing rod 20 for head 22a thereof to disengage switch actuator 58 and then returning the rod to the position in which it closes switch 52 as described above.

Presuming that the vehicle operator has just parked the vehicle and turned off the engine, it will be appreciated that the latter results in opening relay switch 96 to ignition circuit 100 whereby the electrical anti-theft device is armed or activated to inhibit operation of the motor vehicle. Mechanical anti-theft device 10 is then mounted on steering wheel rim 28 and the attachment hooks 24 and 26 locked into position relative to one another, whereby the latter mounting is the only operation the vehicle operator has to accomplish to obtain the dual security of the mechanical and electrical anti-theft devices. Displacement of attachment components 24 and 26 to the mounting position thereof withdraws head 22a of rod 20 from engagement with transmitter switch actuator 58 as described above. This opens switch 52 and thus prepares the transmitter for reactivation to transmit a coded signal upon the subsequent closing of switch 52. When the vehicle owner returns to the vehicle, all he or she has to do is unlock and remove the mechanical anti-theft device from the steering wheel, displace the attachment components to their storage position, whereby head 22a of rod 20 closes transmitter switch 52, and then insert and turn the ignition key to start the vehicle engine within the allotted time. Thus, the advantage of two diverse anti-theft devices is achieved without the inconvenience of manually activating and deactivating the individual devices.

In accordance with another aspect of the invention, rod 20 and keeper 32 of key operated lock mechanism 34 are cooperable to enhance the protection against a thief gaining access to transmitter switch actuator 58 by removing rod 20 from housing 14 when the mechanical device is removed from the vehicle steering wheel. In this respect, with reference to FIGS. 4-6 of the drawing, notches 30 along the length of rod 20 are each defined by corresponding axially spaced apart radial and conical surfaces 154 and 156, respectively. Key actuated keeper member 32 in the locked condition thereof engages in a notch 30 and against radial surface 154 thereof to preclude displacement of rod 20 in the direction of retraction thereof relative to housing 14. As will become apparent hereinafter, conical surfaces 156 permit displacement of rod 20 in the direction of extension thereof relative to housing 14. More particularly in this respect, latch member 32 is slidably supported in a bore 158 in lock housing 18, which bore extends radially with respect to rod 20, and keeper member 32 has a nose 32a at the radially inner end thereof adapted to engage in a notch 30 against the radial face 154 thereof. A spring 160 is interposed between the outer end of keeper 32 and bore 158 and biases keeper member 32 radially inwardly relative to rod member 16. Keeper member 32 is provided with an elongated slot intermediate its opposite ends and which, with respect to the keeper member axis, has an axially extending flat bottom surface 162 and axially spaced apart radially extending end surfaces 164 and 166. Lock mechanism 34 further includes a lock cylinder 168 received in a bore 170 provided therefor in housing portion 18 and secured in the bore by means of a pin 172. Lock cylinder 168 supports a rotatable key operable tumbler, not shown, which is rotatable relative to cylinder 168 and provided on its inner end with a cam 174 which is rotatable therewith. Cam 174 is received in the elongated slot in keeper member 32 and has a flat cam face 176 and a circular cam surface 178 between the opposite ends of face 176.

Figure 5:
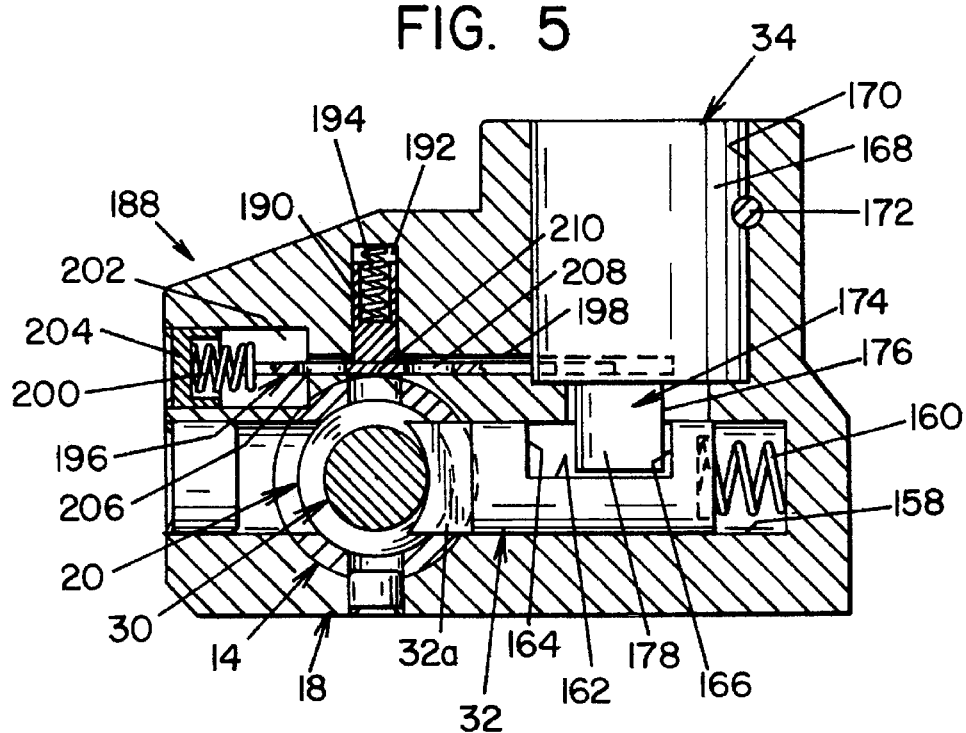
FIG. 5 is cross-sectional view of the lock mechanisms taken along 5—5 in FIG. 4.
Figure 6:
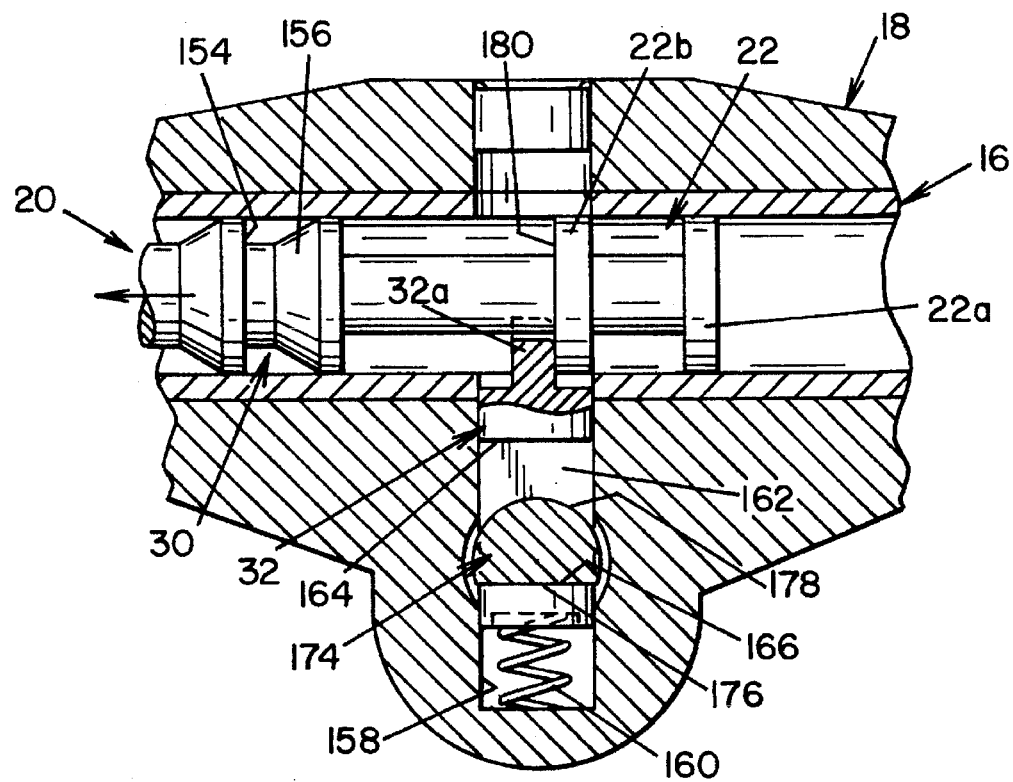
FIG. 6 is a plan view, in section, showing a stop arrangement for precluding separation of the component parts of the mechanical device.
Figure 7:
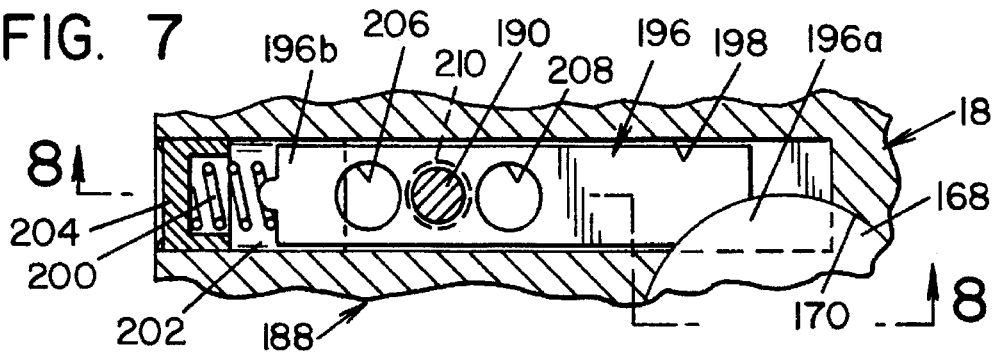
FIG. 7 is an enlarged plan view of the supplemental lock mechanism.

When the component parts of lock mechanism 34 are in the positions thereof shown in FIGS. 4-6 the lock mechanism is in the locked mode. More particularly in this respect, keeper member 32 is in its locked position relative to notch 30 under the bias of spring 160, flat cam face 176 opposes end surface 166 of the slot in the keeper member, and circular cam surface 178 is spaced from surface 164 of the slot in the keeper member such that the keeper member is free to move radially outwardly relative to rod 20 and notches 30 therein against the bias of spring 160. It will be appreciated, therefore, that when the anti-theft device is mounted on a vehicle steering wheel and the key operated lock mechanism is in the locked mode, keeper nose 32a engages against radial surface 154 of one of the notches of rod member 20 to preclude displacement of the rod member to the right in FIG. 4, thus locking the mechanical anti-theft device against removal from the steering wheel. At the same time, presuming the anti-theft device to be removed from the steering wheel, rod member 20 can be displaced to the left in FIG. 4 relative to housing 14 in that conical surfaces 156 of the notches will engage keeper nose 32a and cam the keeper member outwardly of bore 158 against the bias of spring 60, such outward movement being enabled by the space between keeper slot surface 164 and cam surface 178. As will likewise be appreciated from FIGS. 4-6 rotation of cam 174 on the inner end of the lock tumbler through the use of an appropriate key will displace keeper member 32 radially outwardly of rod 20 and notches 30 therein to position the component parts of the key operated lock mechanism in their unlocked positions.

As will be appreciated from the description thus far, if a thief removes anti-theft device 10 from the vehicle steering wheel such as by, for example, cutting the steering wheel rim, rod 20 can be displaced outwardly relative to housing 14 as described above. As will be further appreciated from FIGS. 2 and 3 of the drawing, complete removal of rod 20 from the housing in this manner would enable the thief to access and activate transmitter 36 by inserting a long rod or the like through housing 14 and displacing actuator 58 therewith, thus to enable shifting of the electrical anti-theft device to its condition enabling starting and operating of the motor vehicle. In accordance with one aspect of the invention, such access to the transmitter is precluded by providing for the key operated lock mechanism to interengage with inner end 22 of rod 20 to limit displacement of the rod relative to housing 14 in the direction to achieve separation thereof. Preferably in this respect, as best seen in FIG. 6, inner end 22 of rod 20 is provided with an integral circular stop flange 22b which has a radially extending flat surface 180 which interengages with keeper nose 32a in the locked position of the keeper to stop displacement of rod 20 to the left in FIG. 6 relative to housing 14. In the embodiment disclosed, it will be appreciated that head 22a on the inner end of rod 20 would serve the same purpose in the absence of stop flange 22b being provided on the rod end. The provision of a stop flange in addition to head 22a is preferred for purposes of optimizing the strength and stability of the inner end of the rod when fully extended relative to look housing 18 and housing 14.

In accordance with another aspect of the invention, key operated lock mechanism 34 and rod 20 are adapted to be lockingly interengaged when the rod member is near the stored position thereof in which transmitter 36 is actuated as described hereinabove. This advantageously enables the vehicle owner or authorized operator to lock the mechanical anti-theft device, when removed from the vehicle steering wheel, with the attachment components near the stored position thereof but not in the stored position in which transmitter 36 is activated. This locking feature, which is illustrated in FIG. 3 of the drawing, is obtained by providing the outer end of rod 20 with a locking notch 182 which is similar to notches 30 and, in this respect, includes a radial locking surface 184 and a conical surface 186. Thus, the vehicle owner, through key operated locking mechanism 34, can provide for keeper 32 to engage notch 182 when the component parts are near the storage position, whereby keeper nose 32a engages stop surface 184 to preclude displacement of rod 20 to the right in FIG. 3 relative to housing 14. Notch 182 is located along the length of rod 20 so that such locking engagement with keeper 32 positions head 22a on inner end 22 of rod 20 adjacent head 68 of transmitter actuator 58, whereby the transmitter is not activated. Therefore, even though the mechanical anti-theft device is not mounted on the vehicle steering wheel, a would be thief cannot displace rod 20 inwardly of housing 14 so as to activate transmitter 36. Accordingly, if the vehicle owner for some reason desires not to mount device 10 on the vehicle steering wheel, he or she can nonetheless protect against enabling operation of the vehicle by moving rod 20 and thus the attachment components to the stored position thereof. When the authorized operator desires to enable operation of the vehicle, he or she merely unlocks the key operated lock mechanism and displaces rod 20 inwardly to the stored position of the attachment components, whereby transmitter 36 is activated as described hereinabove. Alternatively, the vehicle owner or authorized operator can displace rod 20 outwardly relative to housing 14 to mount the device on the vehicle steering wheel in that conical surface 186 of notch 182 cams keeper 32 outwardly in the manner of notches 30 described hereinabove and, subsequent to such mounting, the owner can unlock rod 20 as described hereinabove and move the rod inwardly of housing 14 to the stored position of the attachment components to activate transmitter 36.

In accordance with yet another aspect of the present invention, mechanical anti-theft device 10 is provided with a supplemental lock mechanism 188 as shown in FIGS. 4, 5, 7 and 8 of the drawing. As will become apparent hereinafter, supplemental lock mechanism 188 is operable to lock rod 20 against displacement inwardly of housing 14 when device 10 is mounted on a steering wheel in the same manner as key operated lock mechanism 34 in the locked mode thereof. The supplemental lock mechanism is also operable to engage surface 180 of rod stop flange 22b to preclude separation of rod 20 from housing 14 and to engage radial surface 184 of notch 182 to position rod 20 near the stored position of the attachment components as just described. As will likewise become apparent hereinafter, these locking functions of supplemental lock mechanism 188 are achieved in response to tampering with either one of the key operated lock mechanism 34 or the supplemental lock mechanism 188.

Referring now to FIGS. 4, 5, 7 and 8, supplemental lock mechanism 188 includes a supplemental keeper member 190 in the form of a circular pin. The keeper pin is reciprocally supported in a circular bore 192 in lock housing 18 which extends radially with respect to rod 20 and is biased radially inwardly toward rod 20 by a compression spring 194. The supplemental lock mechanism further includes an elongate, flat shifting plate member 196, preferably of metal, reciprocally supported in a shifting plate recess 198 provided in lock housing 18. Recess 198 underlies pin bore 192 and is in a plane radially outwardly adjacent body portion 16 of housing 14 and which plane extends transverse to the axis of pin 190 and the axis of key lock cylinder 168. Plate member 196 has an inner end including an arcuate end surface 196a which normally engages the outer surface of lock cylinder 168 to locate the plate member in a first position in which keeper pin 190 engages the upper side of the plate for example as shown in FIG. 5. A compression spring 200 biases shifting plate 196 in the direction to maintain plate surface 196a in engagement with the outer surface of lock cylinder 168. More particularly in this respect, lock housing 18 is provided with a bore 202 at the outer end of recess 198 and into which outer end 196b of plate 196 extends, and compression spring 200 is interposed between outer end 196b of the shifting plate and a closure plug 204 which is received in bore 202 and secured to lock housing 18 such as by welding. Shifting plate 196 is provided with first and second openings 206 and 208, respectively, which are on opposite sides of keeper pin 190 when shifting plate 196 is in the first position thereof shown in FIGS. 5, 7 and 8 of the drawing, and tubular body portion 16 of housing 14 is provided with a bore 210 underlying shifting plate member 196 and in radial alignment with keeper pin bore 192.

Figure 8:
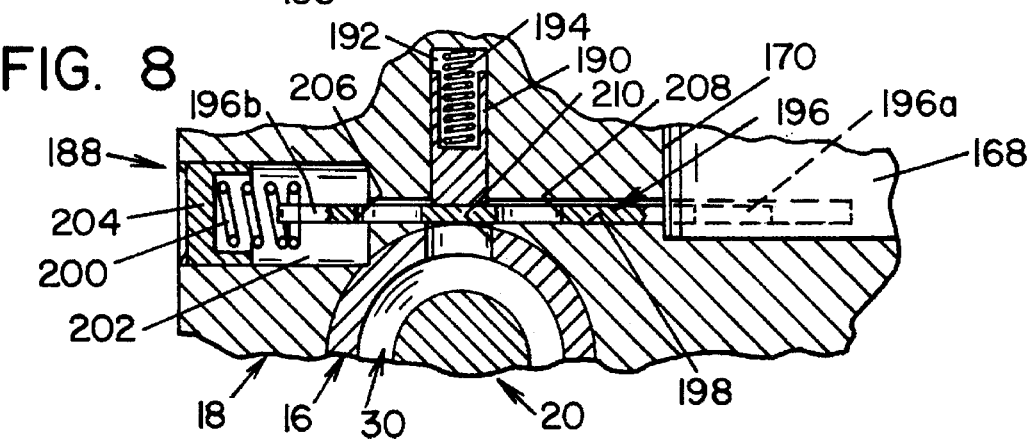
FIG. 8 is a sectional elevation view of the supplemental lock mechanism taken along line 8—8 in FIG. 7 and showing the component parts in the unlocked positions thereof.
Figure 8A:
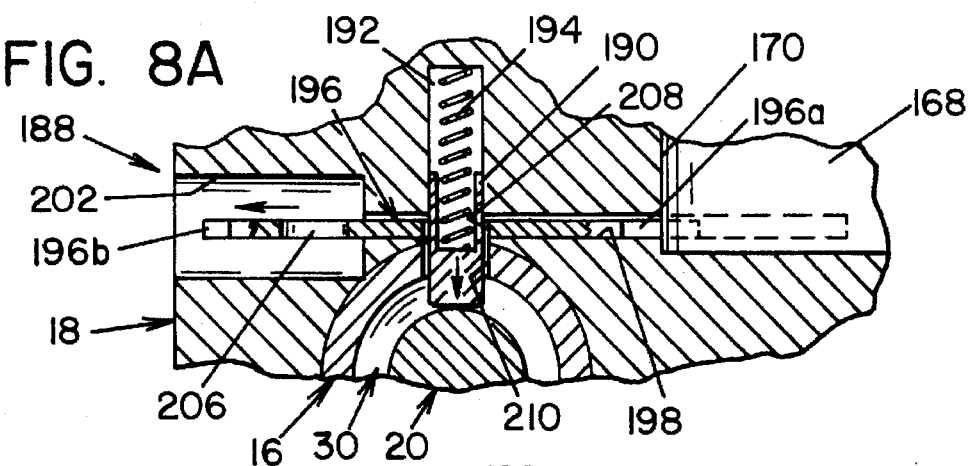
FIG. 8A is a sectional elevation view similar to FIG. 8 and illustrating the component parts of the supplemental lock mechanism in one of the locked positions thereof.
Figure 8B:
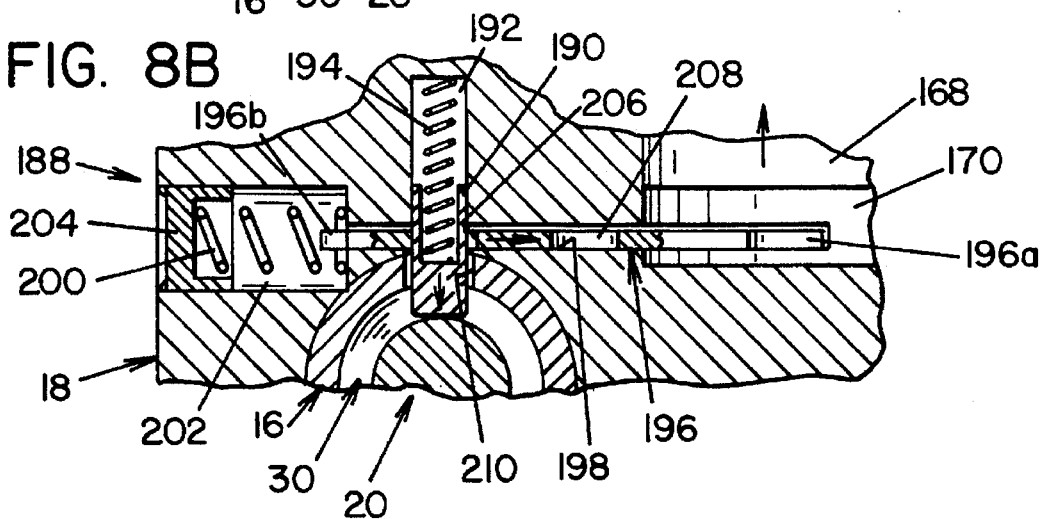
FIG. 8B is a sectional elevation view similar to FIG. 8 and illustrating the component parts of the supplemental lock mechanism in another locked position thereof.

Supplemental lock mechanism 188 has unlocked and locked conditions and, normally, is in the unlocked condition in which supplemental keeper pin 190 engages against shifting plate member 196 in the first position thereof as shown in FIGS. 4, 5, 7 and 8 of the drawing. Presuming anti-theft device 10 to be mounted on a vehicle steering wheel such that nose 32a of keeper 32 of key lock mechanism 34 engages a notch 30 in rod 20 as shown in FIG. 4, tampering with either the key lock mechanism 34 or the supplemental lock mechanism 188 will cause the latter to shift to a locked condition relative to rod 20 of the anti-theft device. In this respect, if a would be thief tampers with key operated lock mechanism 34 so as to achieve removal or partial removal of lock cylinder 168 from bore 170, such as by drilling out lock pin 172, lock cylinder 168 disengages inner end 196a of shifting plate 196, as shown in FIG. 8B, whereupon compression spring 200 biases plate 196 to the right from its first position shown in FIGS. 5, 7 and 8 to a second position shown in FIG. 8B. In the second position of shifting plate 196, first opening 206 through the shifting plate is in alignment with keeper pin 190 and bore 210 in tubular housing 14 and spring 194 biases keeper pin 190 radially inwardly of rod 209 into a notch 30 thereof. Thus, when the would be thief removes lock cylinder 168 and manually manipulates keeper 32 to withdrawal nose 32a from engagement with the corresponding notch in rod 20, keeper pin 190 precludes displacement of rod 20 to the right in FIG. 4 and, thus, precludes removal of the anti-theft device from the steering wheel. Alternatively, should the would be thief tamper with the supplemental lock mechanism instead of the key operated lock mechanism by drilling through or otherwise removing closure plug 204 of the supplemental lock mechanism and attempting to withdrawal shifting plate member 196 outwardly through bore 202, such attempted withdrawal of the shifting plate moves second opening 208 therethrough into alignment with supplemental keeper pin 190 and bore 210 through housing 14 whereupon spring 194 biases keeper pin 190 radially inwardly of rod 20 and into an underlying notch 30 therein. In this disposition, both the key operated lock mechanism and the supplemental lock mechanism engage rod 20 against displacement to the right in FIG. 4 relative to housing 14, thus to preclude removal of the anti-theft device from the vehicle steering wheel.

It will be appreciated from the description herein of the interengaging relationship between the nose of keeper 32 of the key operated lock mechanism and notches 30 in rod 20, that biasing spring 194 enables radially outward displacement of supplemental keeper pin 190 relative to rod 20 by conical surfaces 156 of notches 30, whereby rod 20 can be displaced to the left in FIG. 4 relative to housing 14. Accordingly, if keeper 32 is displaced from its locked position relative to the rod notches, supplemental keeper pin 190 will engage stop flange 22b on inner end 22 of rod 20 to preclude separation of the rod from housing 14. Thus, even if the would be thief first removes anti-theft device from the vehicle steering wheel such as by cutting the rim thereof, and then attempts to tamper with either one of the locking mechanisms, separation of rod 20 from housing 14 is prevented. It will likewise be appreciated from the foregoing description that if the vehicle owner or other authorized operator has unlocked and removed anti-theft device 10 from the steering wheel and has locked rod 20 in the position shown in FIG. 3 such that the inner end of the rod is locked against displacement to activate transmitter 36, tampering with either the key operated lock mechanism or the supplemental lock mechanism will shift the supplemental lock mechanism so as to preclude displacement of rod 20 to actuate the transmitter. In this respect, presuming lock cylinder 168 to have been removed and keeper 32 of the key operated lock mechanism to have been withdrawn from stop notch 182, displacement of rod 20 to the right in FIG. 3 relative to housing 14 will cause supplemental keeper pin 190 to engage in notch 182 and thus preclude sufficient displacement of rod 20 to displace transmitter actuator 58 to activate the transmitter.

While it is preferred as illustrated herein to provide the supplemental lock mechanism in conjunction with a mechanical anti-theft device including a code signal transmitter for controlling an associated electrical anti-theft device, it will be appreciated that the supplemental lock mechanism in conjunction with a mechanical anti-theft device of the character disclosed advantageously provides such a device alone with added protection against removal thereof from a vehicle steering wheel.

It is believed that operation of mechanical anti-theft device 10 in conjunction with controlling activation of transmitter 36 and thus electrical anti-theft device 12 to enable and inhibit operation of a motor vehicle will be understood form the foregoing description. Briefly in this respect, with reference to the schematic illustrations shown in FIGS. 12A–12F of the drawing, FIG. 12A illustrates the rod and housing components and thus attachment components 24 and 26 of device 10 in a position between the mounted and stored position and to which the components are moved from the storage position during mounting of the device on steering wheel rim 28. In this position of the component parts, head 22a on the inner end of rod 20 is displaced from transmitter actuator 58, whereby transmitter activating switch 52 is open and transmitter 36 is deactivated. As shown in FIGS. 12B–12D, device 10 is mounted on steering wheel rim 28 by engaging hook 26 against the inside of rim 28 and thence moving housing 14 relative to rod 20 to engage hook 24 against the diametrically opposite inner side of steering wheel rim 28. During such movement, keeper 32 of the key operated lock mechanism is cammed outwardly relative to the succeeding notches 30 in rod 20. When the attachment components 24 and 26 are in the mounted positions thereof, keeper 32 engages against radial face 154 of one of the notches to preclude displacement of rod 20 inwardly of housing 14 and thus lock attachment components 24 and 26 in the mounted position thereof as shown in FIG. 12D. As will be appreciated from the description herein, displacement of the attachment components from the storage position toward the mounted position thereof opens transmitter switch 52, thus resetting the transmitter to transmit a coded signal upon subsequent closure of switch 52. As will be further appreciated from the description herein, turning off of the vehicle engine prior to mounting anti-theft device 10 on the vehicle steering wheel causes the electrical anti-theft device to shift to its condition inhibiting operation of the motor vehicle. Accordingly, when anti-theft device 10 is mounted on the vehicle steering wheel as shown in FIG. 12D, both the mechanical and electrical anti-theft devices are in their conditions inhibiting operation of the motor vehicle. In this respect, device 10 limits rotation of the steering wheel and thus precludes steering of the vehicle, and the electrical device inhibits starting and thus operation of the motor vehicle.

When the vehicle owner or other authorized operator desires to operate the motor vehicle, he or she removes device 10 from the steering wheel by displacing keeper 32 of the key operated lock mechanism to its unlocked position through the use of an appropriate key K, and thence displacing rod 20 fully into housing 14. This displaces attachment components 24 and 26 to the stored position thereof shown in FIG. 12E and in which head 22a on the inner end of rod 20 displaces transmitter switch actuator 58 to close transmitter switch 52, thus to activate transmitter 36. As will be appreciated from the description herein, activating transmitter 36 causes the latter to transmit coded signal S to the receiver of the electrical anti-theft device, whereby the latter shifts from its condition inhibiting operation of the vehicle to its condition enabling such operation. FIG. 12F illustrates the relative positions of rod 20 and housing 14 when attachment components 24 and 26 are near the storage position thereof illustrated in FIG. 12E. In the position shown in FIG. 12F, keeper 32 engages in stop notch 182 in rod 20, whereby the vehicle owner can lock rod 20 against displacement to the storage position and thus preclude unauthorized actuation of the transmitter when device 10 is not mounted on the vehicle steering wheel.

While considerable emphasis has been placed herein on the structures and structural interrelationships between the component parts of the preferred embodiments of the present invention, it will be appreciated that many embodiments of the invention can be made and that many changes can be made in the embodiments herein illustrated and described without departing from the principles of the invention, whereby it is to be distinctly understood that the foregoing descriptive matter is to be interpreted merely as illustrative of the invention and not as a limitation.

Having thus described the invention it is claimed:

1. An anti-theft system for a motor vehicle comprising an anti-theft device mountable in a vehicle to limit rotation of a vehicle steering wheel and including first and second attachment means displaceable relative to one another between mounting and storage positions, control signal transmitting means on said device having a first condition for transmitting a control signal when said attachment means are in said storage position and a second condition inhibiting transmission of a control signal when said attachment means are in said mounting position, a vehicle control unit mounted on said vehicle and having a first condition enabling operation of said vehicle and a second condition inhibiting operation of said vehicle, said control unit being in said second condition thereof when said attachment means are in said mounting position, and means including control signal receiving means remote from said transmitting means for shifting said control unit into said first condition thereof in response to a control signal transmitted by said transmitting means when said attachment means are displaced from said mounting position to said storage position.

2. An anti-theft system according to claim 1, wherein said anti-theft device includes key operated lock means for releasably locking said first and second attachment means in said mounting position against relative displacement toward said storage position, and supplemental lock means having locked and unlocked conditions with respect to said first and second attachment means, said supplemental lock means normally being in said unlocked conditioned, and means for shifting said supplemental lock means to said locked condition in response to tampering with one of said key operated lock means and said supplemental lock means.

3. An anti-theft system according to claim 1, wherein said anti-theft device includes tubular housing means supporting said first attachment means and rod means slidably received in and supported by said tubular housing means for displacement inwardly and outwardly relative thereto, said rod means supporting said second attachment means for displacement therewith toward and away from said first attachment means, and said housing means and said rod means including interengaging means for limiting displacement of said rod means outwardly relative to said housing means.

4. An anti-theft system according to claim 3, wherein said housing means supports lock means including keeper means and said rod means includes notch means, said lock means having locked and unlocked conditions in which said keeper means is respectively engaged with and disengaged from said notch means, said notch means and said keeper means in said locked condition precluding displacement of said rod means inwardly of said housing means and enabling displacement of said rod means outwardly of said housing means, and said rod means including stop means interengaging with said keeper means to limit said outward displacement.

5. An anti-theft system according to claim 4, wherein said lock means includes key operated tumbler means for displacing said keeper means into and from engagement with said notch means.

6. An anti-theft system according to claim 5, wherein said lock means further includes supplemental lock means in said housing means including supplemental keeper means, said supplemental lock means having locked and unlocked conditions in which said supplemental keeper means respectively engages with and is disengaged from said notch means, said notch means and said supplemental keeper means in said locked condition of said supplemental lock means precluding displacement of said rod means inwardly of said housing means and enabling displacement of said rod means outwardly of said housing means, and said supplemental keeper means interengaging with said stop means to limit said outward displacement.

7. An anti-theft system according to claim 1, wherein said anti-theft device comprises tubular housing means having opposite ends and supporting said first attachment means, said second attachment means including rod means slidably received in one of said opposite ends and having inner end means displaceable toward and away from the other of said opposite ends to respectively position said first and second attachment means in said storage position and said mounting position thereof, said control signal transmitting means being in said housing means between said other of said opposite ends thereof and said inner end means of said rod means, and means for shifting said control signal transmitting means from said second condition thereof to said first condition thereof in response to displacement of said rod end means to position said first and second attachment means in said storage position.

8. An anti-theft system according to claim 7, wherein said means for shifting said control signal transmitting means includes switch means having closed and open conditions corresponding respectively to said first and second conditions of said control signal transmitting means, and means including said end means of said rod means for shifting said switch means to said closed condition in response to displacement of said rod means to position said first and second attachment means in said storage position.

9. An anti-theft system according to claim 8, wherein said switch means includes contact means having closed and open positions corresponding respectively to said closed and open conditions of said switch means, said means for shifting said switch means including actuator means displaceable by said inner end means of said rod means to close said contact means in response to displacement of said rod means to position said first and second attachment means in said storage position.

10. An anti-theft system according to claim 8, wherein said anti-theft device includes key operated lock means for releasably locking said first and second attachment means in said mounting position against relative displacement toward said storage position, and supplemental lock means having locked and unlocked conditions with respect to said first and second attachment means, said supplemental lock means normally being in said unlocked condition, and means for shifting said supplemental lock means to said locked condition in response to tampering with one of said key operated lock means and said supplemental lock means.

11. An anti-theft system according to claim 8, wherein said housing means and said rod means include interengaging means for limiting displacement of said rod means outwardly relative to said one end of said housing means.

12. An anti-theft system according to claim 11, wherein said housing means supports lock means including keeper means and said rod means includes notch means, said lock means having locked and unlocked conditions in which said keeper means is respectively engaged with and disengaged from said notch means, said notch means and said keeper means in said locked condition precluding displacement of said rod means inwardly of said housing means and enabling displacement of said rod means outwardly of said housing means, and said rod means including stop means interengaging with said keeper means to limit said outward displacement.

13. An anti-theft system according to claim 12, wherein said lock means includes key operated tumbler means for displacing said keeper means into and from engagement with said notch means.

14. An anti-theft system according to claim 13, wherein said lock means further includes supplemental lock means in said housing means including supplemental keeper means, said supplemental lock means having locked and unlocked conditions in which said supplemental keeper means respectively engages with and is disengaged from said notch means, said notch means and said supplemental keeper means in said locked condition of said supplemental lock means precluding displacement of said rod means inwardly of said housing means and enabling displacement of said rod means outwardly of said housing means, and said supplemental keeper means interengaging with said stop means to limit said outward displacement.

15. An anti-theft system according to claim 1, wherein said control signal transmitting means includes means for transmitting said control signal in a coded pattern unique to said control signal transmitting means.

16. An anti-theft system according to claim 1, wherein said control signal transmitting means includes means for intermittently transmitting said control signal for a given period of time.

17. An anti-theft system according to claim 16, wherein said control signal transmitting means includes means for transmitting said control signal in a coded pattern unique to said control signal transmitting means.

18. An anti-theft system according to claim 1, wherein said control signal transmitting means includes means for transmitting said control signal in a coded pattern unique to said control signal transmitting means and said control signal receiving means includes means for recognizing said coded pattern.

19. An anti-theft system according to claim 1, wherein said motor vehicle has electrical starting circuit means and said vehicle control unit includes means for inhibiting said starting circuit means when said control unit is in said second condition thereof.

20. An anti-theft system according to claim 19, wherein said means for shifting said control unit into said first condition includes means for validating said control signal transmitted by said transmitting means.

21. An anti-theft system according to claim 20, wherein said motor vehicle includes key operated ignition switch means having on and off modes and said means for shifting said control unit includes means for detecting said switch means in said on mode and means operable only in response to a validated control signal and said ignition switch means in said on mode to shift said control unit into said first condition.

22. An anti-theft system according to claim 1, wherein said anti-theft device comprises tubular housing means having opposite ends and supporting said first attachment means, said second attachment means including rod means slidably received in one of said opposite ends and having inner end means displacable toward and away from the other of said opposite ends to respectively position said first and second attachment means in said storage position and said mounting position thereof, said control signal transmitting means being in said housing means between said other of said opposite ends thereof and said inner end means of said rod means, transmitter actuating means in said housing means, said actuating means being supported for displacement by said inner end means of said rod means in the direction toward said other of said opposite ends of said housing means to shift said signal transmitting means from said second condition thereof to said first condition thereof in response to displacement of said rod means to position said first and second attachment means in said storage position, and positioning means for interengaging said rod means and said housing means to preclude displacement of said actuating means to shift said signal transmitting means to said first condition thereof when said first and second attachment means are near said storage position.

23. An anti-theft system according to claim 22, wherein said housing means supports lock means including keeper means and said rod means has an outer end and includes notch means between said outer end and said inner end means, said lock means having locked and unlocked conditions in which said keeper means is respectively engaged with and disengaged from said notch means, said notch means and said keeper means in said locked condition precluding displacement of said rod means inwardly of said housing means and enabling displacement of said rod means outwardly of said housing means, and said notch means including an outermost notch in said outer end of said rod means interengaging with said keeper means to provide said positioning means.

24. An anti-theft system according to claim 23, wherein said inner end means on said rod means includes stop means for interengaging with said keeper means to preclude removal of said rod means from said housing means.

25. An anti-theft system according to claim 23, wherein said lock means includes key operated tumbler means for displacing said keeper means into and from engagement with said notch means.

26. An anti-theft system according to claim 25, wherein said lock means further includes supplemental lock means in said housing means including supplemental keeper means, said supplemental lock means having locked and unlocked conditions in which said supplemental keeper means respectively engages with and is disengaged from said notch means, said notch means and said supplemental keeper means in said locked condition of said supplemental lock means precluding displacement of said rod means inwardly of said housing means and enabling displacement of said rod means outwardly of said housing means, and said supplemental keeper means interengaging with said outermost notch to provide said positioning means.

27. An anti-theft system according to claim 26, wherein said inner end means on said rod means includes stop means for interengaging with said keeper means and said supplemental keeper means to preclude removal of said rod means from said housing means.

28. An anti-theft system according to claim 27, wherein said motor vehicle has electrical starting circuit means and said vehicle control unit includes means for inhibiting said starting circuit means when said control unit is in said first condition thereof.

29. An anti-theft system according to claim 28, wherein said means for shifting said control unit into said first condition includes means for validating said control signal transmitted by said transmitting means, said motor vehicle includes key operated ignition switch means having on and off modes and said means for shifting said control unit includes means for detecting said switch means in said on mode, and means operable only in response to a validated control signal and said ignition switch means in said on mode to shift said control unit into said first condition.

30. An anti-theft device according to claim 1, wherein said anti-theft device comprises tubular housing means having an axis and axially opposite ends and rod means axially slidably received in said housing means and having an inner end therein and an outer end extending outwardly from one of said opposite ends, one of said first and second attachment means being on said housing means and the other on said outer end of said rod means, key operated lock means supported in a mounted position on said housing means for locking said rod means against axial displacement inwardly of said housing means for locking said rod means against axial displacement inwardly of said housing means relative to said one of said opposite ends of said housing means, and supplemental lock means supported in said housing means for locking said rod means against axial displacement inwardly of said housing means in response to tampering with one of said key operated lock means and said supplemental lock means.

31. An anti-theft system according to claim 30, wherein said supplemental lock means has locked and unlocked conditions, and shifting means for shifting said supplemental lock means from said mounted position.

32. An anti-theft system according to claim 31, wherein said rod means has notch means therein between said inner and outer ends thereof, said key operated lock means includes keeper means for engaging said notch means for lodging said rod means against said axial displacement, and said supplemental lock means includes supplemental keeper means displaceable between a first position disengaging said notch means and a second position engaging said notch means to lock said rod means against said axial displacement, said shifting means normally maintaining said supplemental keeper means in said first position.

33. An anti-theft system according to claim 32, wherein said shifting means has a first position maintaining said supplemental keeper means in said first position thereof and a second position releasing said supplemental keeper means for movement to said second position thereof engaging said notch means.

34. An anti-theft system according to claim 33, wherein said shifting means engages said key operated lock means in said mounted position thereof for said key operated lock means to position said shifting means in said first position thereof, and means for displacing said shifting means to said second position thereof in response to displacement of said key operated lock means from said mounted position thereof to disengage said shifting means.

35. An anti-theft system according to claim 34, wherein said means for displacing said shifting means includes biasing spring means.

36. An anti-theft system according to claim 33, wherein said shifting means has a third position releasing said supplemental keeper means for movement to said second position thereof, said second and third positions of said shifting means being in opposite directions from said first position thereof.

37. An anti-theft system according to claim 32, wherein said key operated lock means has a lock axis and said shifting means includes shifting member means reciprocable transverse to said lock axis between first and second positions and having an end engaging said key operated lock means in said mounted position thereof to position said shifting member means in said first position, said shifting member means in said first position thereof engaging with said supplemental keeper means to maintain said supplemental keeper means in said first position thereof, means for displacing said shifting member means from said first to said second position thereof in response to displacement of said key operated lock means out of engagement with said end of said shifting member means and said shifting member means in said second position thereof releasing said supplemental keeper means for displacement to said second position thereof.

38. An anti-theft system according to claim 37, wherein said supplemental keeper means is supported in said housing means for reciprocating displacement transverse to said shifting member means and has an end engaging said shifting member means in said first position thereof, said shifting member means having an opening therethrough, and said supplemental keeper means in said second position of said shifting member means extending through said opening and into said second position of said supplemental keeper means engaging said notch means.

39. An anti-theft system according to claim 38, wherein said supplemental keeper means includes a pin, and spring means biasing said pin to extend through said opening in said shifting member means.

40. An anti-theft system according to claim 38, wherein said means for displacing said shifting member means includes biasing spring means.

41. An anti-theft system according to claim 40, wherein said shifting member means has a third position releasing said supplemental keeper means for movement to said second position thereof, said second and third positions of said shifting member means being in opposite directions from said first position thereof.

42. An anti-theft system according to claim 41, wherein said opening through said shifting member means is a first opening and said shifting member means has a second opening therethrough spaced from said first opening, said supplemental keeper means in said third position of said shifting member means extending through said second opening and into said second position of said supplemental keeper means engaging said notch means.

43. An anti-theft system according to claim 42, wherein said first and second openings through said shifting member means are on opposite sides of said supplemental keeper means in said first position of said shifting member means.

44. An anti-theft system according to claim 43, wherein said supplemental keeper means includes a pin, and spring means biasing said pin to extend through said first and second openings in said shifting member means.

45. An anti-theft system for a motor vehicle comprising an anti-theft device mountable in a vehicle to limit rotation of a vehicle steering wheel and including first and second attachment means displaceable relative to one another between mounting and storage positions, control signal transmitting means on said device having a first condition for transmitting a control signal when said attachment means are in one of said mounting and storage positions and a second condition inhibiting transmission of a control signal when said attachment means are in the other of said mounting and storage positions, a vehicle control unit mounted on said vehicle and having a first condition enabling operation of said vehicle and a second condition inhibiting operation of said vehicle, said control unit being in said second condition thereof when said attachment means are in said mounting position, and means including control signal receiving means remote from said transmitting means for shifting said control unit into said first condition thereof in response to displacement of said attachment means from said mounting position to said storage position.

46. An anti-theft system according to claim 45, wherein said control signal transmitting means includes means for transmitting said control signal in a coded pattern unique to said control signal transmitting means.

47. An anti-theft system according to claim 45, wherein said control signal transmitting means includes means for intermittently transmitting said control signal for a given period of time.

48. An anti-theft system according to claim 47, wherein said control signal transmitting means includes means for transmitting said control signal in a coded pattern unique to said control signal transmitting means.

49. An anti-theft system according to claim 45, wherein said control signal transmitting means includes means for transmitting said control signal in a coded pattern unique to said control signal transmitting means and said control signal receiving means includes means for recognizing said coded pattern.

50. An anti-theft system according to claim 45, wherein said motor vehicle has electrical starting circuit means and said vehicle control unit includes means for inhibiting said starting circuit means when said control unit is in said second condition thereof.

51. An anti-theft system according to claim 50, wherein said means for shifting said control unit into said first condition includes means for validating said control signal transmitted by said transmitting means.

52. An anti-theft system for a motor vehicle comprising a mechanical anti-theft device mountable in a vehicle to limit rotation of a vehicle steering wheel, control signal transmitting means on said device having a first condition for transmitting a control signal and a second condition inhibiting transmission of a control signal, said device including means for shifting said transmitting means between said first and second conditions, a vehicle control unit mounted on said vehicle and having a first condition enabling operation of said vehicle and a second condition inhibiting operation of said vehicle, and means including control signal receiving means remote from said transmitting means for shifting said control unit from one of said first and second conditions thereof to the other in response to a control signal transmitted by said transmitting means, said motor vehicle having electrical starting circuit means and said vehicle control unit including means for inhibiting said starting circuit means when said control unit is in said first condition thereof, said means for shifting said control unit into said first condition including means for validating said control signal transmitted by said transmitting means, said motor vehicle including key operated ignition switch means having on and off modes, and said means for shifting said control unit including means for detecting said switch means in said on mode and means operable only in response to a validated control signal and said ignition switch means in said on mode to shift said control unit into said first condition.

* * * * *